United States Patent [19]

Smith

[11] 4,006,703
[45] Feb. 8, 1977

[54] FOAMED WAX APPARATUS

[76] Inventor: Judson L. Smith, 5432 Lighthouse Lane, Tempe, Ariz. 85283

[22] Filed: Nov. 10, 1975

[21] Appl. No.: 630,654

Related U.S. Application Data

[62] Division of Ser. No. 432,815, Jan. 14, 1974, abandoned.

[52] U.S. Cl. .................. 118/2; 118/612; 239/311; 239/9; 239/335; 222/132
[51] Int. Cl.² ................ B05C 13/00; B05B 13/00
[58] Field of Search ................ 239/8–10, 239/310, 311, 318, 335, 336, 366, 368, 369, 398, 400, 416.1, 419.3, 419.5, 422, 427.5, 428; 134/93, 100, 101, 26, 29, 6, 131, 198, 123, 30, 32, 36; 222/132; 156/78; 252/382, 128, 140, 145, 154, 160, 163, DIG. 1, DIG. 2, DIG. 3; 106/6, 10; 117/92, 105.5, 168; 118/2, 3, 612; 427/416, 422; 15/DIG. 2, 5.3 AB

[56] References Cited

UNITED STATES PATENTS

| | | | |
|---|---|---|---|
| 2,309,247 | 1/1943 | Johnson | 239/317 X |
| 2,519,062 | 8/1950 | Miskel et al. | 252/161 |
| 2,780,554 | 2/1957 | Lerner | 106/10 |
| 3,075,922 | 1/1963 | Wixon | 252/135 X |
| 3,094,735 | 6/1963 | Hanlon | 106/10 X |
| 3,222,201 | 12/1965 | Boyle et al. | 106/285 |
| 3,242,092 | 3/1966 | Bechtold | 252/140 X |
| 3,306,869 | 2/1967 | Lahr et al. | 106/6 X |
| 3,329,637 | 7/1967 | Vitalis | 106/10 X |
| 3,433,417 | 3/1969 | Poppitz | 239/318 X |
| 3,440,063 | 4/1969 | Chestochowski et al. | 106/10 X |
| 3,459,334 | 8/1969 | Evans | 222/132 |
| 3,537,423 | 11/1970 | Burden | 118/2 |
| 3,610,535 | 10/1971 | Bradshaw | 239/305 |
| 3,639,568 | 2/1972 | Schmitt | 252/163 X |
| 3,718,609 | 2/1973 | Weimer | 252/160 X |
| 3,723,357 | 3/1973 | Hansen | 252/DIG. 13 |

Primary Examiner—Robert S. Ward, Jr.
Attorney, Agent, or Firm—Klarquist, Sparkman, Campbell, Leigh, Hall & Whinston

[57] ABSTRACT

Foamed wax is produced and sprayed onto automobiles following the washing thereof by automatic washing apparatus. Liquid wax is combined with a foaming agent, water and air to form a foamed wax which can be conveniently dispersed by conventional automatic car washing equipment, resulting in an improved shine and more complete drying of the surface.

8 Claims, 8 Drawing Figures

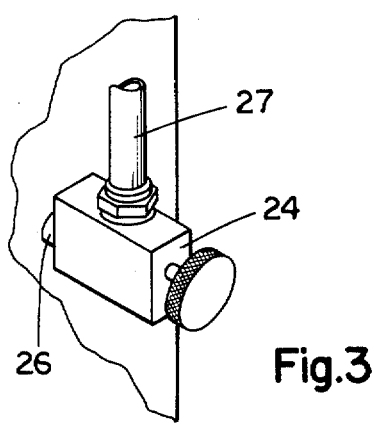
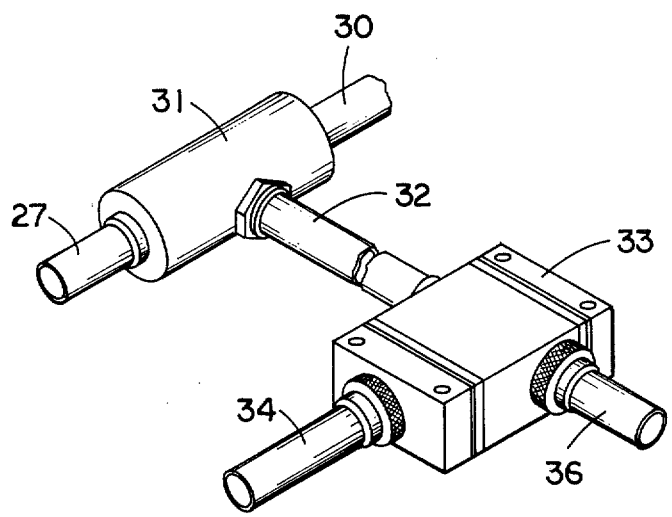
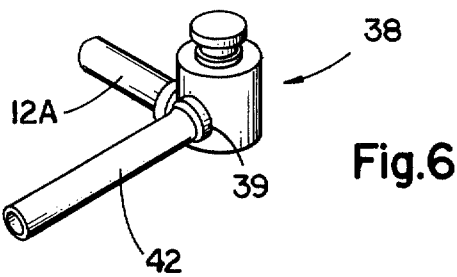
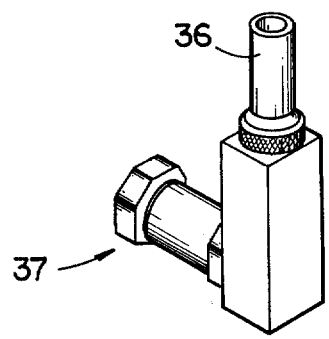
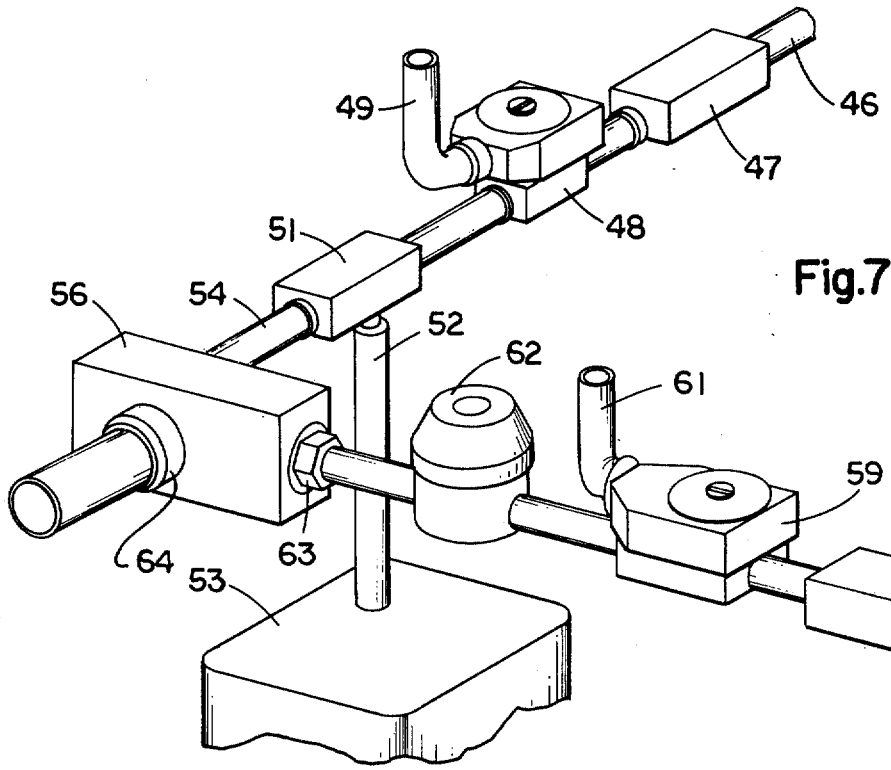
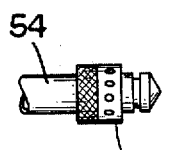

FOAMED WAX APPARATUS

CROSS REFERENCE TO RELATED APPLICATION

This is a division of application Ser. No. 432,815 filed Jan. 14, 1974 and now abandoned.

BACKGROUND OF THE INVENTION

FIELD OF THE INVENTION

This invention relates to a process and apparatus for applying foamed wax to automobiles and other waxable surfaces. The process comprises mixing a liquid wax and a foaming agent, adding water to the liquid wax, foaming agent mixture, and then injecting or bubbling air into the aqueous liquid wax-foaming agent mixture. This final foamed mixture can then be sprayed onto an automobile or other surface desired to be waxed.

Automatic car wash operations have achieved widespread consumer acceptance in recent years. In addition to facilities for washing the outside of an automobile, these automatic car wash operations often are capable, for an additional fee, of providing related services which are associated with automobile care and appearance. For example, these automatic car wash operations often provide facilities for waxing an automobile and facilities for vacuum cleaning the inside of an automobile. While waxing facilities are associated with automatic car wash operations, these facilities regretfully are usually inadequate for the purpose of applying an adequately protective coat of wax to the exterior of cars. In addition there is skepticism on the part of consumers as to whether or not wax is actually being applied to the automobile as the only indication of wax is generally a blinking light or some other visual indication. In addition, since a small amount of wax is normally incorporated into the water used to rinse cars in automatic car washes, in order to facilitate drying, the beading of water during drying does not indicate the application of a lasting coating of wax. These two facts, i.e. that the consumer cannot actually see the wax being applied to his car, and that the consumer cannot immediately determine the results of the wax application, have resulted in a genuine reluctance on the part of consumers to have wax applied to their automobiles when using automatic car wash facilities.

Therefore it is an object of this invention to provide a process for producing a hot or cold foam wax, that can be applied by automatic car wash facilities.

It is a further object of this invention to provide an apparatus for conveniently applying a foamed wax to a moving automobile or other surface.

It is a still further object of this invention to provide a foamed wax which produces both a drier and a shinier surface after application.

These and other objects of this invention will become apparent from the following description of the preferred embodiment.

SUMMARY OF THE INVENTION

This invention relates to a process and apparatus for producing and applying foamed wax to various surfaces and more specifically automobiles in an automatic car wash. The foamed wax is formed by combining an aqueous aerated liquid wax, hot or cold, with air, and spraying it through an appropriate nozzle or nozzles onto the surface to be waxed.

BRIEF DESCRIPTION OF THE DRAWINGS

FIG. 3 is an enlarged fragmentary pictorial view of the wax mixture dispensing control needle valve.

FIG. 4 is an enlarged pictorial view of the foaming chamber and air-operated dispensing control valve.

FIG. 5 is a pictorial view of the typical dispensing nozzle and connector therefor.

FIG. 6 is an enlarged pictorial view of the manually operable dispenser enabling control valve.

FIG. 7 is a pictorial view of a second embodiment which omits the pressurized tank, and substitutes an ejector apparatus for combining the wax with water and directing it to the foaming chamber, and using electrically controlled solenoid valves for control of the water and air supply.

FIG. 8 is a fragmentary view of a third embodiment wherein the water-wax mixture is supplied to an air entraining foaming nozzle, instead of introduction of air upstream of the nozzle.

DESCRIPTION OF THE PREFERRED EMBODIMENT

Figure 1:
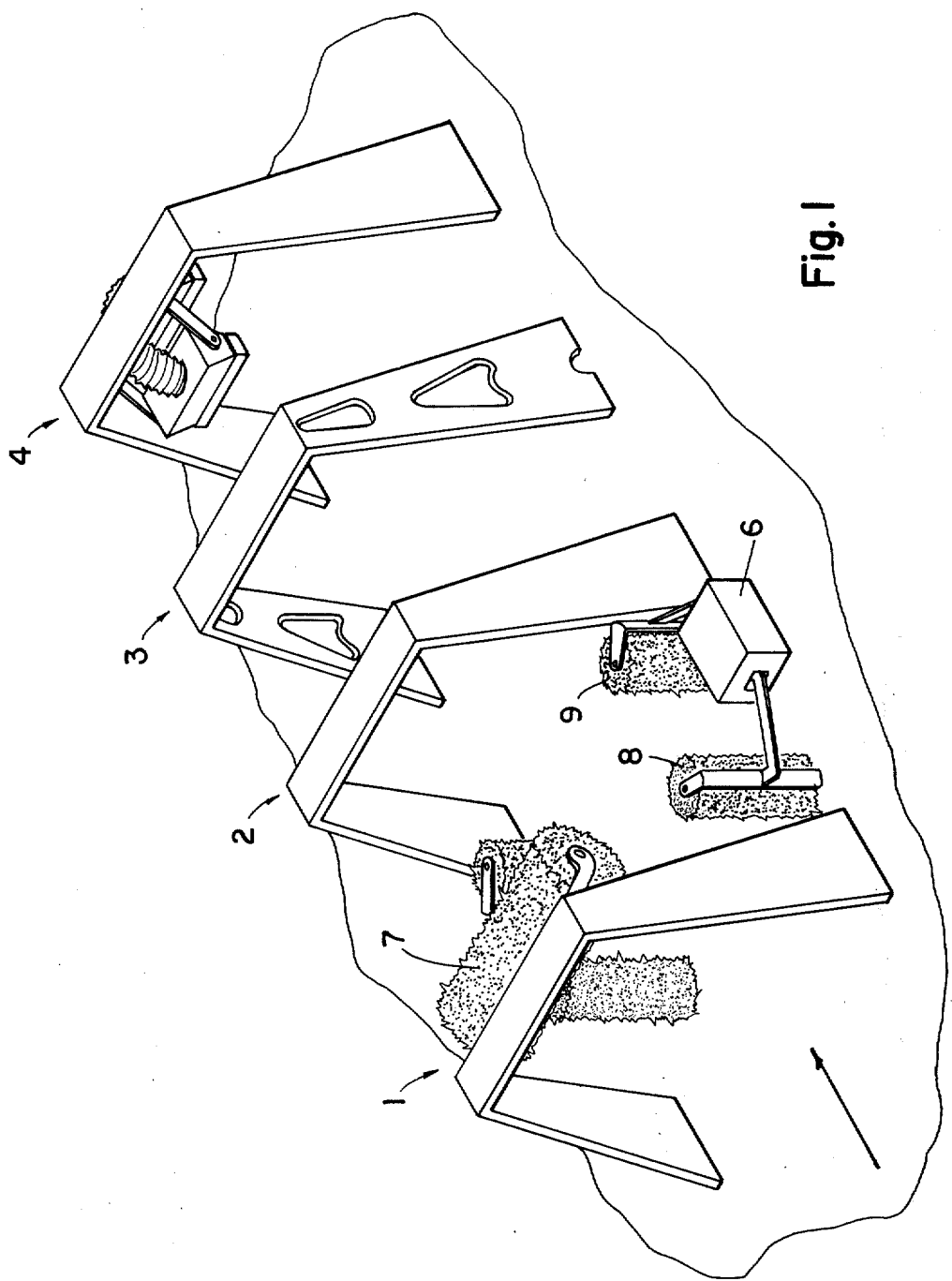
FIG. 1 is a pictorial drawing of a complete automatic car wash, including the foam wax dispensing arch according to a typical embodiment of this invention.

Traditionally, automatic car washes of the type now becoming extremely popular, have offered hot or cold wax for an additional fee. As mentioned previously, there had been great consumer skepticism as to (1) how much wax actually goes onto the car, and (2) how much wax actually stays on the car due to the simultaneous washing process the car is undergoing. The foam wax process and apparatus of this invention allows the consumer, while going through an automatic car wash, to actually observe the foam wax going onto his car and to watch it stay on his car and thus set and allow more wax to be deposited on the car surface. This represents a significant advantage over previous methods of waxing in normal automatic car washes. As a further feature for consumer acceptance, a color (such as blue, red, yellow or orange, for example) can be added to the foam wax mixture.

Some of the advantages of using foam are that the foam is readily visible to the consumer; and the foam is stable for a finite period of time. This allows it to work more efficiently on the car surface but, at the same time, the foam can be broken down very quickly by the addition of water and thus can be recycled.

Foam is generally defined as a heterogeneous mixture of a gaseous phase and a liquid phase and, more specifically, finely divided gas bubbles suspended in a liquid. Stated differently, foam is a group of bubbles separated from one another by thin films, the aggregation having a finite static life. A foam is formed when bubbles rise to the surface of a liquid and persist without coalescence with one another or without rupture into the vapor space. The formation of foam then, consists simply of the formation, rise, and aggregation of bubbles in a liquid in which foam can exist.

The liquid waxes which may be used with the process of this invention, are those traditionally used in automatic car washes. These go under a variety of trade names, some of which are "Hot Carnauba Wax", "Turtle Wax", "Blue Coral", and many others. However, in neral, waxes are defined as a substance having the properties of (a) crystalline to microcrystalline structure, (b) the capacity to acquire gloss when rubbed, (c) the capacity to produce paste or jells with suitable lids or when mixed with other waxes, (d) low viscosity at just below the melting point, (e) low solubility in solvents for fats at room temperatures. Waxes are derived from various sources such as minerals, vegetables and synthetic material. However, the most common waxes used in car waxes are vegetable waxes and, more particularly, carnauba waxes which are formed from complex alcohols, hydrocarbons, and resins. Different waxes will react differently to the foaming operation of this process. Therefore, the actual wax used will be a matter of personal choice and preference.

Specific examples of wax and foaming agents used herewith are those marketed by Sun Ray Chemical Corp., 115 East Jackson, Phoenix, Ariz., under Sun Glow, Part No. 0024 for the wax, and Part No. 0023 for the foaming agent. In the preferred embodiment of this invention, these are used in proportions of one part of wax, one part of foaming agent, to fifty parts of water. It is believed that under some circumstances, the foaming agent can be varied from one-tenth of a part to two parts, per part of wax, per fifty parts of water. The proportion of water used, can be decreased from fifty parts, but the performance is not significantly improved, if improved at all, and the cost is significantly increased.

As suggested above, the preferred embodiment employs a pressurized tank with an aqueous mixture of wax, water and foaming agent therein. Another embodiment uses an unpressurized tank, and by an ejector apparatus employing the "Dema" type ejector, mixes wax with water, and then adds compressed air in a foaming chamber. A convenient, but less preferred embodiment of this invention is the use of foaming nozzles at the point of application rather than the injecting of air into the system. Although the foaming nozzles do work, they are less preferred because the foaming nozzles depend on the atmosphere for the air necessary to cause the bubbling and resulting foam. Therefore, when operated inside an automatic car wash where there is a great deal of moisture and other atmospheric saturation, they may operate at substantially reduced efficiency. Therefore although it is a viable embodiment of this invention, it is a less preferred embodiment.

The foam when formed and applied to the automobile or other surface is then stable for a finite period of time, generally less than ten minutes. This is advantageous in that first, the foam actually visibly adheres to the car, allowing the consumer to see for himself that wax is actually being applied, and second, when the excess wax is blown off, it can be easily recycled. In some car washes, a labor force called "detailers" will "wipe down" the vehicle at the end of the drying cycle to produce a throughly dried vehicle. In such car washes, the amount of foam wax dispensed at the foam wax arch, can be adjusted to a higher output causing a thin foam film to appear on the vehicle at the end of the drying cycle. This foam wax film can then be embedded into the vehicle's surface by the detailers, giving the appearance of a "hand waxed job".

One of the best advantages of the foam wax procedure according to this invention, is the additional effectiveness in the drying of the surface of an automobile. In actual operation, the foam wax acts like a sponge in the absorption of the rinse water in automatic car washes. This produces a car which is dryer at the exit end of the automatic car wash, than would otherwise be the case.

The actual concentration of the wax and the quality of the foam are up to the individual applicator and can be varied from a very rich wax to one which is virtually water, air and minor quantities of wax.

FIG. 1 illustrates how the foamed wax procedure can be used in combination with a standard automatic car wash unit. A car or other surface to be washed and/or waxed enters the automatic unit at the entrance arch 1. This pre-rinse arch 1 is designed to apply water and soap to the car or other vehicle surface. Overhead brush unit 7 then scrubs the car to more completely remove dirt and grime. Side brush units such as 8 and 9 mounted to pad 6 do likewise. The remaining soap and water is removed by rinse arch 2 which comprises multiple jets of water being directed onto the surface to be cleaned. Foamed wax applicator 3 next applies the coat of foamed wax to the particular surface. Again as in rinse arch 2, multiple jets are used to apply the foamed wax. Finally the automobile is blown dry by drying arch 4. FIG. 1 represents one of many possible variations of automatic car wash, all of which comprise the same basic steps with variations coming in terms of the number of rinses, amount and application of soap, and the actual machinery used.

Referring now to the foam wax generation and dispensing apparatus itself, in FIGS. 2 through 6, the air source 11 feeds regulated air pressure on line 12 to the lower portion of the fiberglas or metal foam wax tank 13 of preferably 40 gallon capacity, at point 14. This air supply line 12 is attached to a one-way fluid check valve 16 and then coupled to one end 17A of a two part, quick disconnecting coupling 17. The other half 17B of the quick disconnecting coupling is either tapped into or attached to the tank. Air input into the lower portion of the wax tank aids the "agitating" the wax solution for better foaming results.

Air pressure on the tank, typically 80-120 pounds per square inch, is measured by the air pressure gauge 18, either tapped into or attached to the upper portion of the tank. A standard drain cock valve 19 is tapped into or attached to the upper portion of the tank, for relief of pressure from the tank.

A liquid level gauge, 21 is either tapped into or attached to the lower portion of the tank as at 22 and also at about three-fourths of the height of the tank as at 23.

At the lower portion of the tank are manually adjustable needle valve flow controls 24 either tapped into or attached to the tank as at 26 (FIG. 3). These needle valves regulate the flow of the liquid foam wax solution out of the tank through tubing 27.

The manually adjustable needle valve flow controls 28 at the upper portion of the tank are attached in the same manner as those in the lower portion. These regulate the flow of air out of the tank, at the upper portion. There should be one liquid needle valve flow control and one air needle valve flow control for every one foaming nozzle in the foam wax dispensing arch 3.

The separate air line 30 and the liquid line 27, coming from the tank, are joined and mixed at a T fitting 31 (FIG. 4) acting as a foam chamber then exiting into a three-eights inch O.D. line 32 and continuing, now carrying foam, to a two-way normally-closed, air operated valve having an operating air supply through tube 34. Upon the opening of this air operated valve, the foam wax solution exits this valve through tube 35, and continues until it reaches its connected dispensing nozzle such as 37, for example, (FIGS. 2 and 5) and is dispensed.

Figure 2:
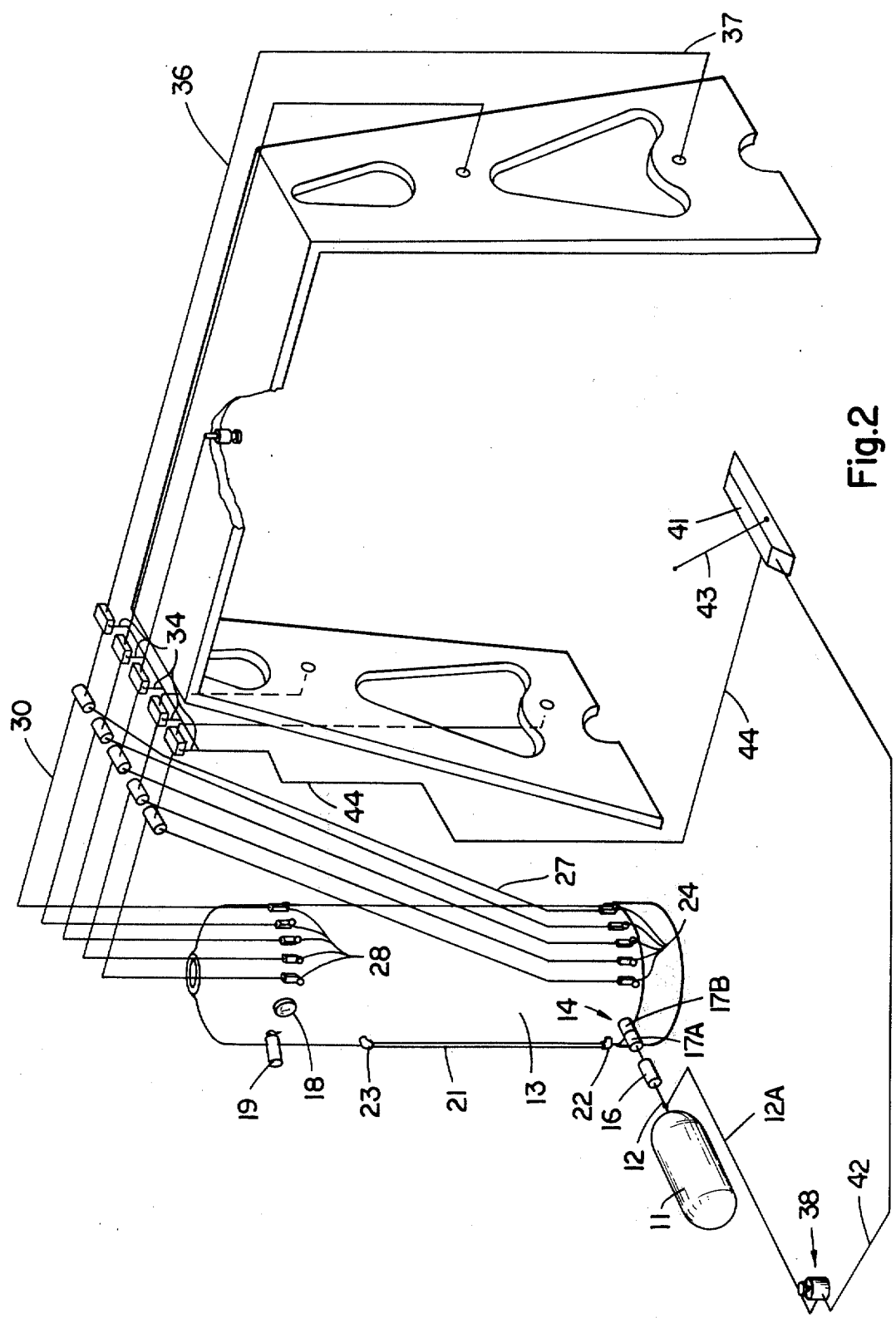
FIG. 2 is a combination pictorial and schematic diagram of the foam wax producing, dispensing, and control apparatus.

Now, the air source 11 also supplies regulated air pressure to the manually operated push-pull air switch 38 (FIGS. 2 and 6) at point 12A. For foam wax to be dispensed to a car, the operator opens this valve. The opening of this valve allows the direct air pressure, entering through tube 12A to flow and proceed from outlet 39 to a two-way, normally-closed, air valve 41, through line 42. The conveyor pushed automobile depresses rod 43 which opens the two-way air valve 41, and permits an unobstructed flow of air to continue from valve 41, through line 44 to lines 34 connected to the air pressure ports of the two-way normally closed, air operated valves 33 (FIGS. 2 and 4). This increased air pressure opens these normally closed valves and permits the flow of the foamed wax solution out through a three-eights inch O.D. tube 36 for each valve to the corresponding foam nozzle therefor. The application of foaming wax will continue until the moving automobile has passed over the two-way air valve 41, and spring loaded rod 43 recoils to close the valve.

Referring to the alternate embodiment of FIG. 7, a direct water flow line 46 enters and passes through a one-way fluid check valve 47, then into a two-way, normally-closed, electric solenoid valve 48.

The electrical connection 49 carries the current which opens the solenoid 48. The water flow continues and passes through the Dema (ejector-type) valve system 51, which creates a suction in line 52, which draws up the wax solution from a tank 53, mixing with the water and exiting at line 54 and continuing to the foaming chamber 56. Accordingly, the pressurized tank 13 of FIG. 2 is not used.

Tube 57 supplies regulated air pressure into and through the one-way check valve 58, continuing into another normally closed, two-way, 110 volt or 24 volt electric solenoid valve 59. Upon activating and opening by a signal at the electric input 61, the air continues to pass into and through an air regulator 62 and enters the foaming chamber 56 at point 63. The air and water/wax solution mix and agitate the solution into foam which exits at point 64 to be dispensed through lines 36 (FIG. 2) to the foaming nozzles.

The signal to valves 48 and 59 can be supplied by a wand or rod-controlled electric switch instead of the air switch 41 of FIG. 2. Electric supply to that (wand controlled) switch can be provided by an electric bi-stable switch in place of the push-pull valve 38 of FIGS. 2 and 6. The switches and valves can be chosen to operate at whatever voltage is convenient, 24 volts or 110 volts A.C. being typical.

The alternative embodiment of the apparatus of this invention is substantially shown in FIG. 8. In FIG. 8, a conventional foaming nozzle, is shown at point 66. The procedure as in the embodiment of FIG. 7 is followed exactly, with the exception that the air is not injected into the system. Instead, nozzle 66 incorporates air by suction from the atmosphere. This results in a foaming operation and is directly applied to the automobile or other surface to be waxed.

As suggested above, a color can be added to the foam wax solution, and will serve as a direct consumer benefit in that it can be more readily seen by the car wash customer. Also, heat can be added in the tank itself, or the tubes leading to the nozzles can be heated to produce a hot foaming wax. If space between rinse arch and dryer arch is too limited to permit installation of a foam wax dispensing arch, it can be installed following the dryer arch, and the detailers or the customer himself can wipe off and/or rub down the wax.

While in the example given above, sodium lauryl sulfonate, provides a suitable foaming agent, others may also be used.

While the invention has been illustrated and described in detail, the drawings and foregoing description, the same is to be considered as illustrative and not restrictive in character, it being understood that only the preferred embodiment has been shown and described, and that all changes and modifications that come within the spirit of the invention and the scope of the claims are also desired to be protected.

The invention claimed is:
1. A wax dispensing apparatus comprising:
  a. a tank which is adapted to hold and dispense a mixture of liquid wax and foaming agent,
  b. a water supply conduit,
  c. means for combining said liquid wax-foaming agent mixture with said water,
  d. means for introducing air into said water, liquid wax-foaming agent combination to cause said liquid wax combination to foam, and
  e. a means for spraying said foam on a surface to be waxed,
said tank having air compressed therein,
said air introducing means including air injecting means connected to said tank below the level of said liquid wax-foaming agent combination therein.
2. The apparatus of claim 1 wherein:
said means for injecting air includes a plurality of liquid outlet lines connected at said tank below the level of liquid in said tank, and a plurality of air outlet lines connected to said tank above the level of liquid in said tank, and a plurality of foaming chambers, each chamber being connected to one of said air outlet lines and to one of said liquid outlet lines, said foaming chamber having an outlet connected to one of said spraying means.
3. The apparatus of claim 2 wherein said spraying means are nozzles, and further comprising:
control means in a line connecting one of said foaming chambers to one of said nozzles and operable when actuated, to pass foamed wax to said nozzle.
4. The apparatus of claim 3 wherein:
said control means include a valve in said line and a vehicle operated switch connected to said valve.
5. The apparatus of claim 4 wherein:
said nozzles are disposed in a generally U-shaped array and said vehicle operable switch is in the path of a vehicle through said array.
6. A wax dispensing apparatus comprising:
  a. a tank which is adapted to hold and dispense a mixture of liquid wax and foaming agent,
  b. a water supply conduit,
  c. means for combining said liquid wax-foaming agent mixture with said water,
  d. means for introducing air into said water, liquid wax-foaming agent combination to cause said liquid wax combination to foam, and
  e. a means for spraying said foam on a surface to be waxed,
said water conduit being pressurized,
said combining means including an ejector connected to said tank and to said conduit for drawing said mix- ture from said tank into water flowing from said conduit through said ejector.

7. The apparatus of claim 6 wherein:
said means for introducing air include compressed air line coupled to the outlet of said ejector.

8. A wax dispensing apparatus comprising:
a. a tank which is adapted to hold and dispense a mixture of liquid wax and foaming agent,
b. a water supply conduit,
c. means for combining said liquid wax-foaming agent mixture with said water,
d. means for introducing air into said water, liquid wax-foaming agent combination to cause said liquid wax combination to foam, and
e. a means for spraying said foam on a surface to be waxed,
said means for spraying being nozzles,
said means for introducing air being foaming nozzles.

* * * * *

UNITED STATES PATENT OFFICE
CERTIFICATE OF CORRECTION

PATENT NO. : 4,006,703
DATED : February 8, 1977
INVENTOR(S) : Judson L. Smith

It is certified that error appears in the above-identified patent and that said Letters Patent are hereby corrected as shown below:

Col. 2, line 33, change "had" to --has--

4, line 33, insert --a-- before "point"

4, line 39, change "the" (2nd occurrence) to --in--

4, line 63, change "T" to --"T"--

5, line 30, after "solenoid" insert --valve--

5, line 31, change "Dema" to --"Dema"--

Signed and Sealed this

Seventeenth Day of May 1977

[SEAL]

Attest:

RUTH C. MASON
*Attesting Officer*

C. MARSHALL DANN
*Commissioner of Patents and Trademarks*